US011166030B2

(12) United States Patent
Kwon et al.

(10) Patent No.: US 11,166,030 B2
(45) Date of Patent: *Nov. 2, 2021

(54) METHOD AND APPARATUS FOR SSIM-BASED BIT ALLOCATION

(71) Applicant: TEXAS INSTRUMENTS INCORPORATED, Dallas, TX (US)

(72) Inventors: Do-Kyoung Kwon, Allen, TX (US); Hyung-Joon Kim, Suwanee, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,619

(22) Filed: Apr. 2, 2020

(65) Prior Publication Data

US 2020/0236365 A1    Jul. 23, 2020

Related U.S. Application Data

(63) Continuation of application No. 16/377,373, filed on Apr. 8, 2019, now Pat. No. 10,645,394, which is a continuation of application No. 16/110,347, filed on Aug. 23, 2018, now Pat. No. 10,298,936, which is a continuation of application No. 15/181,210, filed on Jun. 13, 2016, now Pat. No. 10,085,030, which is a continuation of application No. 13/632,392, filed on Oct. 1, 2012, now Pat. No. 9,369,703.

(60) Provisional application No. 61/540,587, filed on Sep. 29, 2011.

(51) Int. Cl.
  *H04N 19/154*    (2014.01)
  *H04N 19/172*    (2014.01)
  *H04N 19/115*    (2014.01)
  *H04N 19/194*    (2014.01)

(52) U.S. Cl.
  CPC ......... *H04N 19/154* (2014.11); *H04N 19/115* (2014.11); *H04N 19/172* (2014.11); *H04N 19/194* (2014.11)

(58) Field of Classification Search
  CPC .. H04N 19/154; H04N 19/115; H04N 19/172; H04N 19/194
  See application file for complete search history.

(56) References Cited

U.S. PATENT DOCUMENTS

2011/0310962 A1* 12/2011 Ou ..................... H04N 19/159
                                                        375/240.03

* cited by examiner

*Primary Examiner* — Nam D Pham
(74) *Attorney, Agent, or Firm* — Ebby Abraham; Charles A. Brill; Frank D. Cimino

(57) ABSTRACT

An embodiment includes a method and an encoder for SSIM-based bits allocation. The encoder includes a memory and a processor utilized for allocating bits based on SSIM, wherein the processor estimates the model parameter of SSIM-based distortion model for the current picture and determines allocates bits based on the SSIM estimation.

17 Claims, 3 Drawing Sheets

METHOD AND APPARATUS FOR SSIM-BASED BIT ALLOCATION

CROSS-REFERENCE TO RELATED APPLICATIONS

This application is a continuation of U.S. patent application Ser. No. 16/377,373, filed Apr. 8, 2019, which is a continuation of U.S. patent application Ser. No. 16/110,347, filed Aug. 23, 2018, now U.S. Pat. No. 10,298,936, which is a continuation of U.S. patent application Ser. No. 15/181,210, filed Jun. 13, 2016, now U.S. Pat. No. 10,085,030, which is a continuation of U.S. patent application Ser. No. 13/632,392, filed Oct. 1, 2012, now U.S. Pat. No. 9,369,703, which claims the benefit of U.S. provisional patent application Ser. No. 61/540,587, filed Sep. 29, 2011, all of which are herein incorporated by reference.

BACKGROUND OF THE INVENTION

Field of the Invention

Embodiments of the present invention generally relate to a method and apparatus for SSIM-based bit allocation.

Description of the Related Art

Bit rate affects the video quality. Thus, it is crucial to allocate the effective amount of bits per frame to maintain quality and efficiency/cost. Mean Square Error is still major metric being used in video encoder control and optimization. However, Mean Square Error based encoder is far from perceptual optimization. Even though SSIM (Structural Similarity) index is a good quality metric for subjective video quality assessment and more correlated than Mean Square Error to a human's visual perception, yet, currently, there is no SSIM-based rate and/or distortion models.

Therefore, there is a need for a method and/or apparatus for SSIM-based bit allocation.

SUMMARY OF THE INVENTION

Embodiments of the present invention relate to a method and an encoder for SSIM-based bits allocation. The encoder includes a memory and a processor utilized for allocating bits based on SSIM, wherein the processor estimates the parameter of SSIM-based distortion model for the current picture and determines allocates bits based on the SSIM estimation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The proposed invention minimizes overall SSIM distortion, which is more correlated with human perceptual quality than MSE, while existing bit allocation methods focus on minimization of overall MSE distortion The proposed invention provides the optimal number of bits for each coding unit in a closed form. And encoded video by the proposed bit allocation will be more pleasing to human visual system.

SSIM index evaluates the quality of reconstructed coded frame r by comparing luminance, contrast and structural similarities between r and original frame o. That is, $$SSIM(o,r) = l(o,r) \cdot c(o,r) \cdot s(o,r),$$

where $$l(o,r) = \frac{2\mu_o \mu_r + C_1}{\mu_o^2 + \mu_r^2 + C_1},$$

$$c(o,r) = \frac{2\sigma_o \sigma_r + C_2}{\sigma_o^2 + \sigma_r^2 + C_2} \text{ and}$$

$$s(o,r) = \frac{2\sigma_{or} + C_3}{\sigma_o \sigma_r + C_3}.$$

$C_1$, $C_2$ and $C_3$ are constants to avoid unstable behavior in the regions of low luminance or low contrast.

The range of SSIM index is 0 to 1. SSIM index is close to 1 when two frames are similar. For example, when two frames are identical, SSIM index is 1. So distortion is 1−SSIM. With MSE as a distortion metric, it is well known that distortion is modeled by $$D_{MSE} = \sigma^2 \cdot \exp\{-\beta R\},$$

where $\sigma^2$ is variance of residual signal and where $\beta$ is model parameter.

Residual signal is difference between original and prediction. We observe that distortion in terms of SSIM (i.e. 1−SSIM) is modeled by the similar function. That is, $$1-SSIM(o,r) = (1-SSIM(o,p)) \cdot \exp\{-\beta R\},$$

where is model parameter and p is prediction.

By replacing 1−SSIM (o, r) and 1−SSIM (o, p) with $D_{ssim}$ and $D'_{ssim}$, respectively, for simplicity, we have $$D_{SSIM} = D'_{SSIM} \cdot \exp(-\beta R), \quad (1)$$

where is model parameter and p is prediction.

Figure 1:
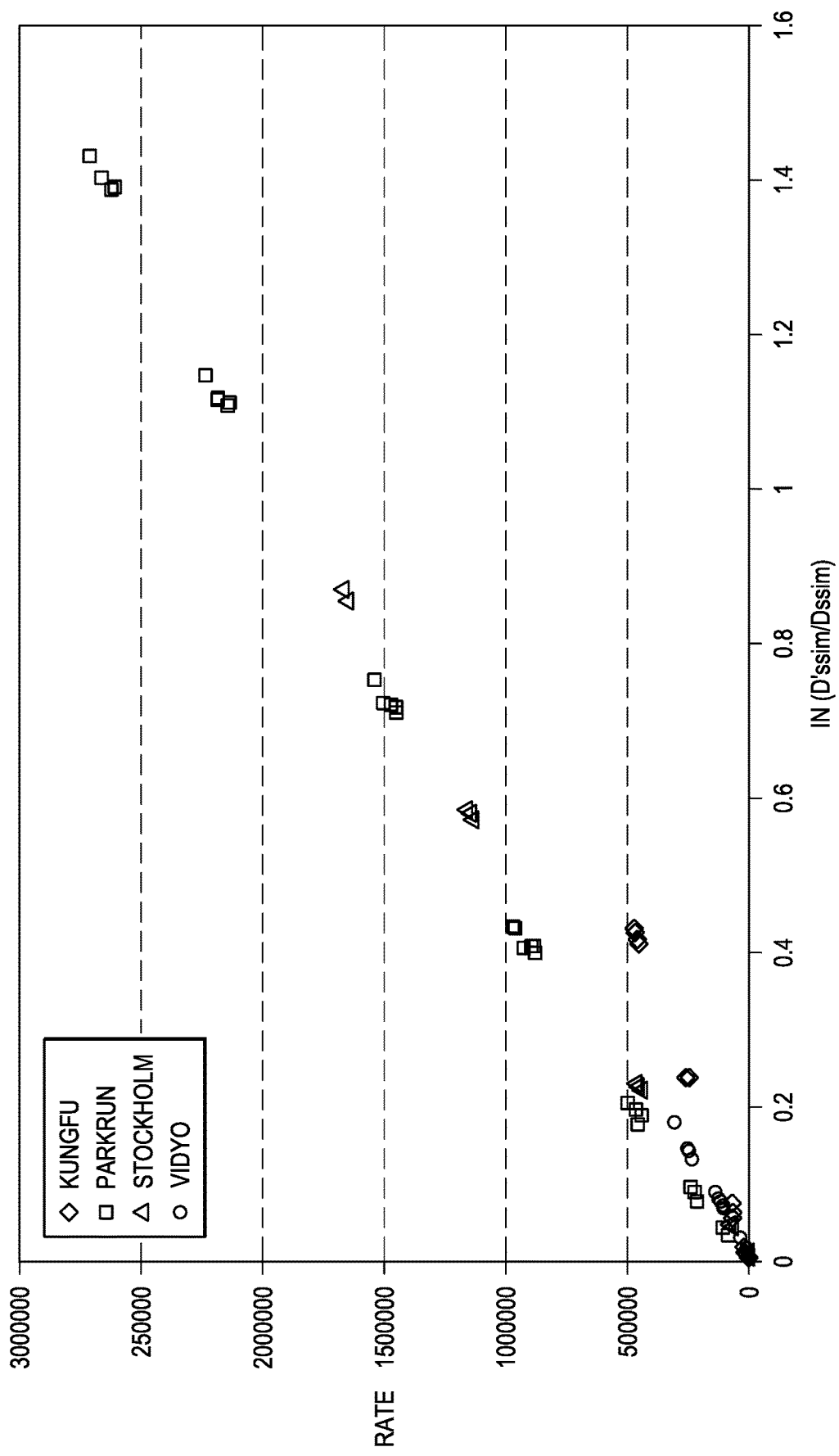
FIG. 1 is an embodiment of a relationship between ln (D'ssim/Dssim) and Rate.

FIG. 1 is an embodiment of a relationship between ln (D'ssim/Dssim) and Rate. FIG. 1 shows the relationship between ln ($D'_{SSIM}/D_{SSIM}$) and rate for 5 consecutive P frames from 4 720p sequences. Hence, Eq. (1) is valid with different values of $\beta$ depending on the characteristics of frames (coding units).

Applying the SSIM-based distortion model for perceptually optimized bit allocation and assuming that there are n coding units (e.g. frame) to encode with total bit budge $R_T$, the overall perceptual quality is optimized with $R_T$. That is, $$\text{minimize} \sum_{i=1}^{N} D_{SSIM,i} \text{ subject to } \sum_{i=1}^{N} R_i \le R_T.$$

Here we assume that all coding units are independent. This constrained problem can be converted to the unconstrained problem with Lagrange multiplier:

$$\text{minimize } J = \sum_{i=1}^{N} D_{SSIM,i} + \lambda \cdot \left( \sum_{i=1}^{N} R_i - R_T \right)$$

$$= \sum_{i=1}^{N} \beta_i \cdot D'_{SSIM,i} \cdot \exp(-\beta_i R_i) + \lambda \cdot \left( \sum_{i=1}^{N} R_i - R_T \right).$$

By setting partial derivative_w.r.t and $\lambda$ and $R_k$ to 0, we have optimal bits for coding unit k as $$R_k = \frac{1}{\beta_k} \ln(\beta_k \cdot D'_{SSIM,k}) + \frac{1}{\beta_k \cdot \sum_{i=1}^{N} \frac{1}{\beta_i}} \cdot \left\{ R_T - \sum_{i=1}^{N} \frac{1}{\beta_i} \ln(\beta_i \cdot D'_{SSIM,i}) \right\}. \quad (2)$$

The proposed bit allocation in Eq. 2 can be implemented in various ways. For example, two-pass method and approximated one-pass method. In two pass method, all coding units are coded with fixed QP in the first pass to get $\beta$ and $D'_{SSIM}$ for all coding units in consideration. Then after determining $R_k$ for all coding units, they are finally coded in the second pass. In the approximated one-pass method, $\beta$ and $D'_{SSIM}$ are approximated from previous coding units. In case of frame bit allocation in GOP, $\beta$ and $D'_{SSIM}$ values of all frames in a GOP can be approximated from frames at the same positions in the previous GOP.

Figure 2:
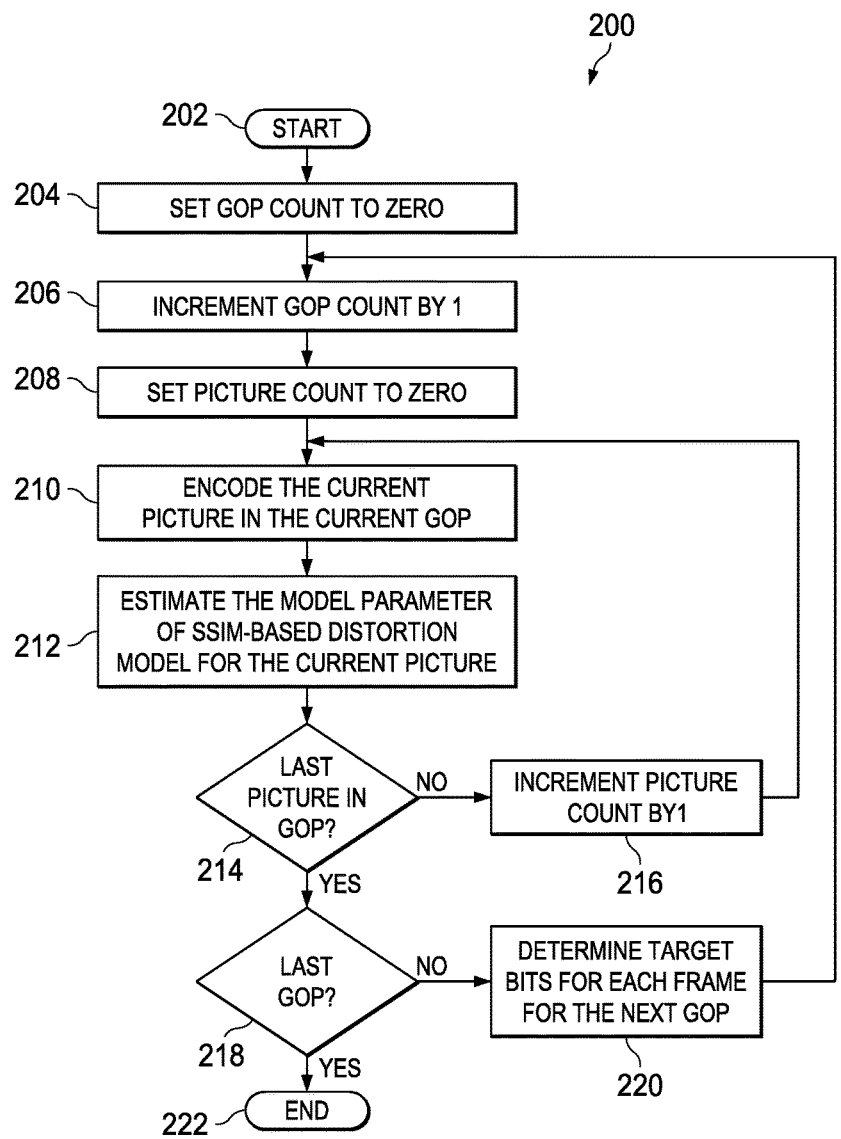
FIG. 2 is an embodiment of a flow diagram depicting a method for SSIM-based bit allocation.

FIG. 2 is an embodiment of a flow diagram depicting a method 2100 for SSIM-based bit allocation. The method 200 starts at step 202 and proceeds to step 204. At step 204, the method 200 set GOP count to zero. At step 206, the method 200 increments the GOP count by 1. At step 208, the method 200 sets the picture count to zero. At step 210, the method 200 encodes the current picture in the current GOP. At step 212, the method 200 estimates the model parameter of SSIM-based distortion model for the current picture. At step 214, the method 200 determines if the current picture is the last picture in the current GOP.

If it is not the last picture in the current GOP, the method 200 proceeds to step 216, wherein the method 200 increments the picture count and returns to step 206; otherwise the method proceeds to step 218. At step 218, the method 200 determines if the current GOP is the last GOP. If it is, the method 200 proceeds to step 222; otherwise, the method 200 proceeds to step 220. At step 220, the method 200 determines the target bits for each frame for the next GOP and returns to step 210. The method 200 ends at step 222.

Figure 3:
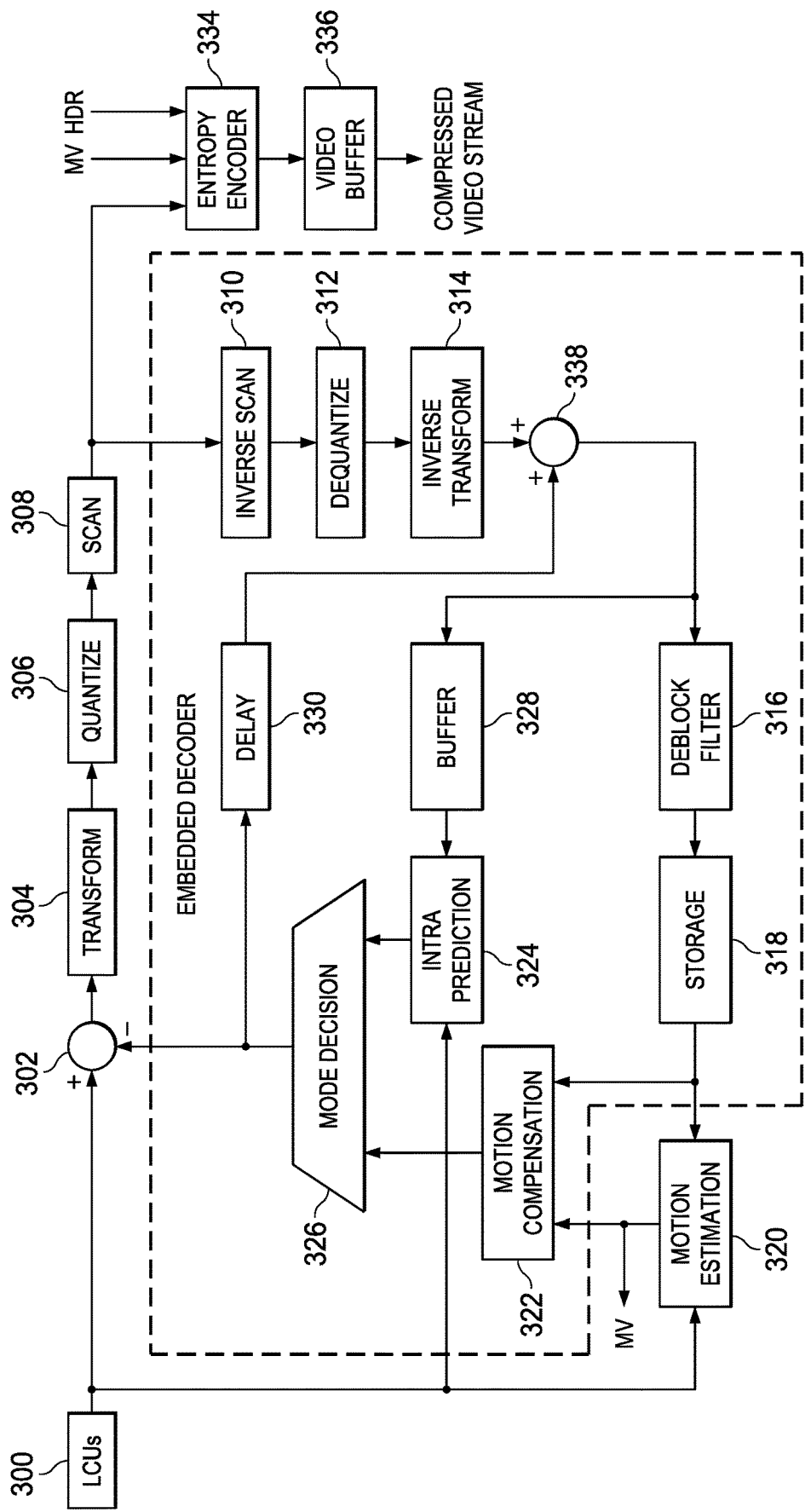
FIG. 3 is an embodiment of an encoder.

FIG. 3 shows a block diagram of the largest coding units (LCU) processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU coding unit (CU) structure for each CU and provides information regarding this initial LCU CU structure to the various components of the video encoder as needed. The coding control component also may determine the initial prediction unit (PU) and transform unit (TU) structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into PUs according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted PU of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted PUs are also provided to the mode decision component 326.

The intra-prediction component 324 provides intra-prediction information to the mode decision component 326 that includes intra-predicted PUs and the corresponding intra-prediction modes. That is, the intra-prediction component 324 performs intra-prediction in which tests based on multiple intra-prediction modes and transform unit sizes are performed on CUs in an LCU using previously encoded neighboring PUs from the buffer 328 to choose the best intra-prediction mode for each PU in the CU based on a coding cost.

To perform the tests, the intra-prediction component 324 may begin with the CU structure provided by the coding control. The intra-prediction component 324 may divide each CU indicated in the CU structure into PUs according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted PUs and the associated transform block sizes are also provided to the mode decision component 326.

The mode decision component 326 selects between the motion-compensated inter-predicted PUs from the motion compensation component 322 and the intra-predicted PUs from the intra-prediction component 324 based on the coding costs of the PUs and the picture prediction mode provided by the mode selector component. The decision is made at CU level. Based on the decision as to whether a CU is to be intra- or inter-coded, the intra-predicted PUs or inter-predicted PUs are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted PU from the current PU to provide a residual PU to the transform component 304. The resulting residual PU is a set of pixel difference values that quantify differences between pixel values of the original PU and the predicted PU. The residual blocks of all the PUs of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantize component 306 may also determine the position of the last non-zero coefficient in a TU according to the scan pattern type for the TU and provide the coordinates of this position to the entropy encoder 334 for inclusion in the encoded bit stream. For example, the quantize component 306 may scan the transform coefficients according to the scan pattern type to perform the quantization, and determine the position of the last non-zero coefficient during the scanning/quantization.

The quantized transform coefficients are taken out of their scan ordering by a scan component 308 and arranged sequentially for entropy coding. The scan component 308 scans the coefficients from the highest frequency position to the lowest frequency position according to the scan pattern type for each TU. In essence, the scan component 308 scans backward through the coefficients of the transform block to serialize the coefficients for entropy coding. As was previously mentioned, a large region of a transform block in the higher frequencies is typically zero. The scan component 308 does not send such large regions of zeros in transform blocks for entropy coding. Rather, the scan component 308 starts with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 334. In some embodiments, the scan component 308 may begin scanning at the position of the last non-zero coefficient in the TU as determined by the quantize component 306, rather than at the highest frequency position.

The ordered quantized transform coefficients for a CU provided via the scan component 308 along with header information for the CU are coded by the entropy encoder 334, which provides a compressed bit stream to a video buffer 336 for transmission or storage. The header information may include the prediction mode used for the CU. The entropy encoder 334 also encodes the CU and PU structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values. The inverse transform component 314 may perform techniques for IDCT pruning as described herein.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

The encoder efficiency to perform these functions is largely dependent on bit allocation. The encoder 300 allocated bits based on SSIM estimations. Such allocation is described in more detail in FIG. 2.

While the foregoing is directed to embodiments of the present invention, other and further embodiments of the invention may be devised without departing from the basic scope thereof, and the scope thereof is determined by the claims that follow.

The invention claimed is:

1. An encoder, comprising:
a coding control component, configured to:
receive a digital video frame; and
divide the digital video frame onto a plurality of coding units (CUs);
a transform component coupled to the coding control component, the transform component configured to perform block transforms on the plurality of CUs, to generate a plurality of transform coefficients; and
a quantize component coupled to the transform component, the quantize component configured to:
determine a plurality of parameters of a structural similarity index (SSIM)-based distortion model for the plurality of CUs, based on characteristics of the plurality of CUs;
allocate a plurality of bit budgets for the plurality of coding units based on the plurality of parameters; and
quantize the plurality of transform coefficients using the plurality of bit budgets, to generate a plurality of quantized coefficients.

2. The encoder of claim 1, further comprising a scan component coupled to the quantize component, the scan component configured to sequentially arrange the plurality of quantized coefficients, to generate a plurality of ordered transform coefficients.

3. The encoder of claim 2, further comprising an entropy encoder coupled to the scan component, the entropy encoder configured to:
perform entropy encoding on the plurality of ordered transform coefficients, to generate a compressed bit stream; and
store the compressed bit stream in a video buffer.

4. The encoder of claim 3, further comprising a transmitter coupled to the video buffer, the transmitter configured to transmit the compressed bit stream.

5. The encoder of claim 3, further comprising storage coupled to the video buffer, the storage configured to store the compressed bit stream.

6. The encoder of claim 2, further comprising:
an inverse scan component coupled to the scan component, the inverse scan component configured to arrange the plurality of ordered transform coefficients, to generate a plurality of reordered transform coefficients;
a dequantize component coupled to the inverse scan component, the dequantize component configured to dequantize the plurality of reordered transform coefficients, to generate a plurality of reconstructed transform results; and
an inverse transform component coupled to the dequantize component, the inverse transform component configured to:
generate a second plurality of transform coefficients based on the plurality of reconstructed transform results; and
apply an inverse transform to the second plurality of transform coefficients, to generate a plurality of reconstructed residual values.

7. The encoder of claim 6, further comprising an in-loop filter component coupled to the inverse transform component, the in-loop filter component configured to:
filter the plurality of reconstructed residual values, to generate filtered reference data; and
store the filtered reference data in storage.

8. The encoder of claim 1, wherein the quantize component is further configured to:
perform a first encoding of the plurality of CUs with fixed quantization parameters, to generate first pass coding;
determine the plurality of parameters for the plurality of CUs based on the first pass coding; and
determine the plurality of bit budgets for the plurality of CUs based on the plurality of parameters.

9. The encoder of claim 8, wherein the quantize component is further configured to perform a second encoding of the plurality of CUs based on the plurality of bit budgets.

10. The encoder of claim 1, wherein the quantize component is further configured to determine the plurality of parameters for the plurality of CUs is performed based on previous coding units.

11. A decoder, comprising:
a dequantize component configured to dequantize a plurality of transform coefficients, to generate a plurality of reconstructed transform results, wherein the plurality of transform coefficients have been generated by an encoder configured to:
determine a plurality of parameters of a structural similarity index (SSIM)-based distortion model for the plurality of CUs, based on characteristics of the plurality of CUs;
allocate a plurality of bit budgets for the plurality of coding units based on the plurality of parameters; and
quantize the plurality of transform coefficients using the plurality of bit budgets, to generate a plurality of quantized coefficients; and
an inverse transform component coupled to the dequantize component, the inverse transform component configured to:
generate a second plurality of transform coefficients based on the plurality of reconstructed transform results; and
apply an inverse transform to the second plurality of transform coefficients, to generate a reconstructed picture.

12. The decoder of claim 11, further comprising an inverse scan component coupled to the dequantize component, the inverse scan component configured to arrange a plurality of ordered transform coefficients, to generate the plurality of transform coefficients.

13. The decoder of claim 11, further comprising a receiver coupled to the dequantize component, the receiver configured to receive the plurality of transform coefficients.

14. The decoder of claim 11, wherein the decoder is configured to retrieve the plurality of transform coefficients from storage.

15. The decoder of claim 11, wherein the decoder is configured to send the reconstructed picture to a display.

16. The decoder of claim 11, wherein the decoder is configured to store the reconstructed picture in storage.

17. A method comprising:
receiving, by a coding control component of an encoder, a digital video frame; and
dividing, by the coding control component of the encoder, the digital video frame onto a plurality of coding units (CUs);
performing, by a transform component of the encoder, block transforms on the plurality of CUs, to generate a plurality of transform coefficients;
determining, by a quantize component of the encoder, a plurality of parameters of a structural similarity index (SSIM)-based distortion model for the plurality of CUs, based on characteristics of the plurality of CUs;
allocating, by the quantize component of the encoder, a plurality of bit budgets for the plurality of coding units based on the plurality of parameters; and
quantizing, by the quantize component of the encoder, the plurality of transform coefficients using the plurality of bit budgets, to generate a plurality of quantized transform coefficients.

* * * * *